United States Patent
Ogasawara

Patent Number: 5,097,185
Date of Patent: Mar. 17, 1992

[54] METHOD AND DEVICE FOR CONTROLLING SPEED OF A MOTOR IN A POWERED SEAT

[75] Inventor: Hiromitsu Ogasawara, Akishima, Japan

[73] Assignee: Tachi-s Co., Ltd., Tokyo, Japan

[21] Appl. No.: 603,874

[22] Filed: Oct. 23, 1990

[51] Int. Cl.⁵ .............. H02P 3/00; H02P 7/00
[52] U.S. Cl. .................... 318/268; 318/257
[58] Field of Search ............. 318/590, 592, 599, 603, 318/625, 626, 628, 638, 648, 652, 653, 280–286, 369, 366, 374, 256–263, 265, 266, 269, 277, 278, 268, 68, 54, 55, 446, 447, 461, 568.1, 484; 388/804, 815, 821, 908, 932, 838; 307/10.1–10.9; 180/170; 280/808

[56] References Cited

U.S. PATENT DOCUMENTS

| | | | |
|---|---|---|---|
| 4,467,252 | 8/1984 | Takeda et al. | 318/603 |
| 4,563,625 | 1/1986 | Kornbrekke et al. | 318/283 X |
| 4,689,537 | 8/1987 | Mizuta et al. | 318/603 X |
| 4,706,194 | 11/1987 | Webb et al. | 318/466 X |
| 4,707,788 | 11/1987 | Tashiro et al. | 318/466 X |
| 4,808,897 | 2/1989 | Saito et al. | 318/466 X |
| 4,813,721 | 3/1989 | Mora | 318/466 X |
| 4,881,020 | 11/1989 | Hida et al. | 318/626 |
| 4,924,162 | 5/1990 | Sahamoto et al. | 318/569 |
| 5,004,967 | 4/1991 | Ogasawara | 318/568.1 |
| 5,006,771 | 4/1991 | Ogasawara | 318/568.1 |

Primary Examiner—William M. Shoop, Jr.
Assistant Examiner—A. Jonathan Wysocki
Attorney, Agent, or Firm—Oldham & Oldham Co., L.P.A.

[57] ABSTRACT

A method and device for controlling a motor in a powered seat, wherein, in an automatic control mode, a rated voltage is applied to the motor, thereby causing a constant high rotation of the motor, and in a manual control mode, firstly the rated voltage is applied to the motor and secondly after a given time, the voltage is changed into a low voltage, causing the motor to be driven at a low rotation rate. Thus, the movable parts of seating posture adjustment device in the seat are moved rapidly in the automatic mode, while in the manual mode, they are firstly moved rapidly and then slowly for permitting an accurate adjustment of position thereof.

5 Claims, 3 Drawing Sheets

METHOD AND DEVICE FOR CONTROLLING SPEED OF A MOTOR IN A POWERED SEAT

FIELD OF THE INVENTION

The present invention relates to a drive system in a powered seat for an automotive seat, and particularly relates to a method and device for controlling a motor in the powered seat to adjust the seating posture adjustment mechanisms in order to adjust the various seating positions of the seat.

DESCRIPTION OF PRIOR ART

Recently, a general powered seat has been computerized in controlling a motor and its related seating adjustment mechanisms so that an occupant on the seat may attain a best seating posture for driving the car, i.e. the fore-and-aft, vertical and reclining positions of the seat. A memory system is provided in its electric circuit, allowing free memory call in order to effect automatic actuation of the mechanism from a given seat position to a memorized position (memory position). A manual switch is also equipped therein for permitting fine adjustment of the seat in the various positions manually.

Now, a mention is given regarding a seat slide device, concerning the foregoing seating adjustment mechanism, in which the seat is quickly slid in a longer distance of seat slide motions between the given seat and memory positions, by virtue of a rapid rotation of the motor. In this case, it has been found defective that both operations of the memory and manual switches result in the rapid drive of the motor, which makes it difficult for stopping the seat, exactly at a desired point, thus preventing practically the fine adjustment of the seat position in fore-and-aft directions.

For that reason, a hitherto, technique has caused the motor to produce rapid and slow drives separately for the respective manual and automatic (memory) switch operations, by electrically switching over a voltage, a high voltage or low voltage( to the motor.

However, conversely, in the slow voltage case in such two-speed motor drive, the torque of the motor is greatly reduced, not enough to overcome a friction coefficient found at the initial motion point of the slide device, which is several or over ten times as high the same coefficient measured in normal motion thereof, as a consequence of which, a problem has been with such low torque, resulting in non-drive of the motor for actuating the seat slide device.

SUMMARY OF THE INVENTION

In view of the above-stated drawback, it is a purpose of the present invention to provide a method and device for controlling a motor in a powered seat, which permits two-speed change of the motor while retaining a required torque thereof, so as to enable an accurate adjustment of seating posture adjustment device in the seat.

For that purpose, in accordance with the present invention, a step is given for permitting choice of manual control mode to be effected by a manual switch and automatic control mode to be effected by a memory switch capable of storing in memory data for positions of the seating posture adjustment device and calling said data, and in the manual control mode, initially a voltage is applied from a power source to the motor, thereby causing the motor to be driven at a high rotation rate, and then after a given time, the voltage is changed into a low voltage through a low-voltage power source automatically, thus driving the motor at a low rotation rate. In the automatic control mode, the voltage is applied to the motor constantly for driving it at a normal rotation rate.

Preferably, for the manual mode, an electric circuit involved includes a pair of electric lines arranged in parallel, which are connected with the power source, one of them having the low-voltage power source disposed midway therein, and the other of them also having, disposed midway therein, a relay contact of a voltage control relay, whereby turning on the relay contact will apply a voltage to the motor constantly, while turning off the relay contact will apply a low voltage through the low-voltage power source to the motor.

Accordingly, in the automatic mode, the motor is driven constantly at a high rotation rate to move the seating posture adjustment device rapidly from a present position to a memory position, and in the manual mode, the motor is firstly driven at a high rotation rate and then after a given time driven at low rotation, which allows an accurate fine adjustment of position of the device at a desired point.

EMBODIMENT OF THE INVENTION

Figure 1:
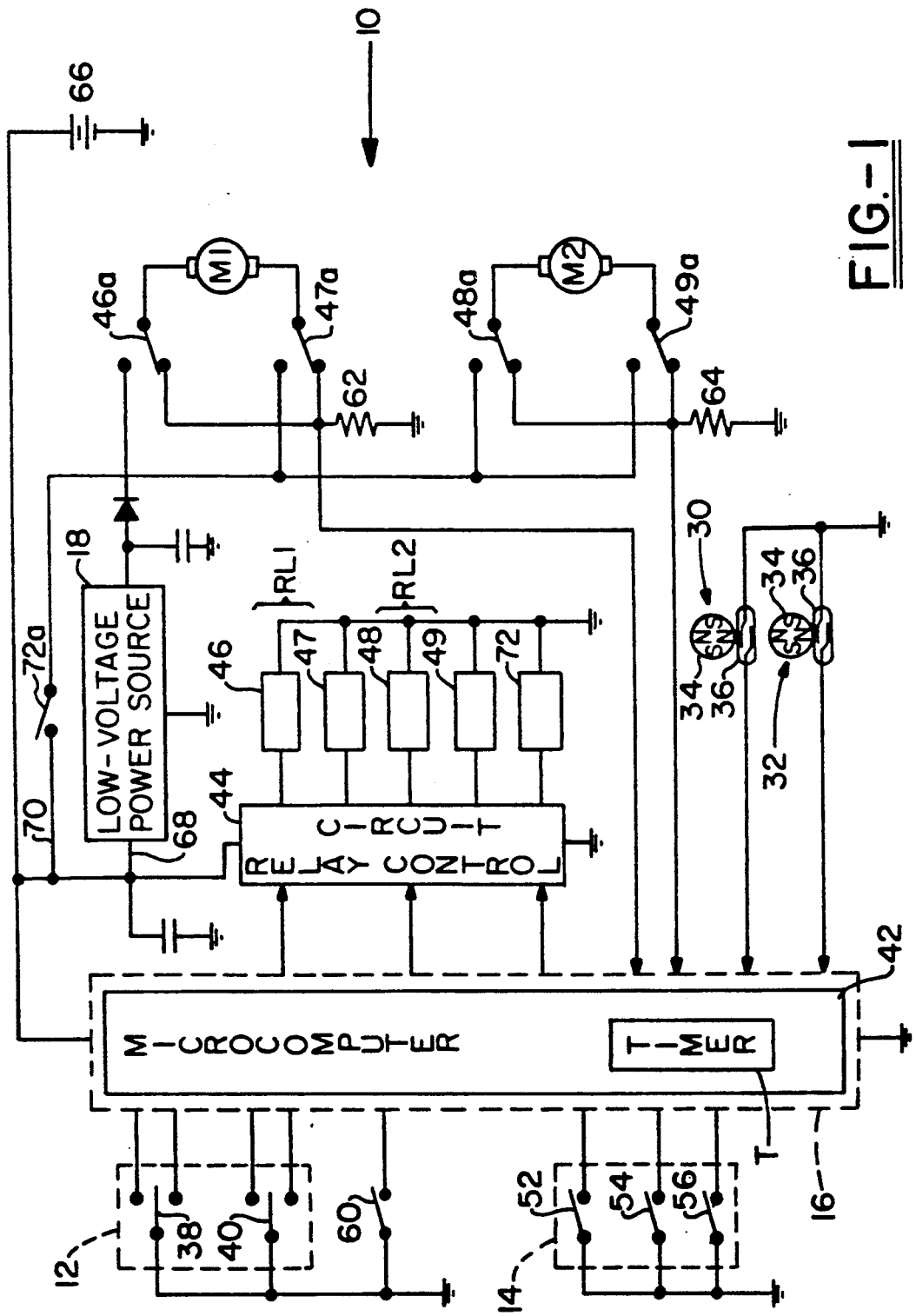
FIG. 1 is a block circuit diagram for a device for controlling a motor in a powered seat according to the present invention, in which a central processing unit is disposed as a main control means in the circuit.
Figure 2:
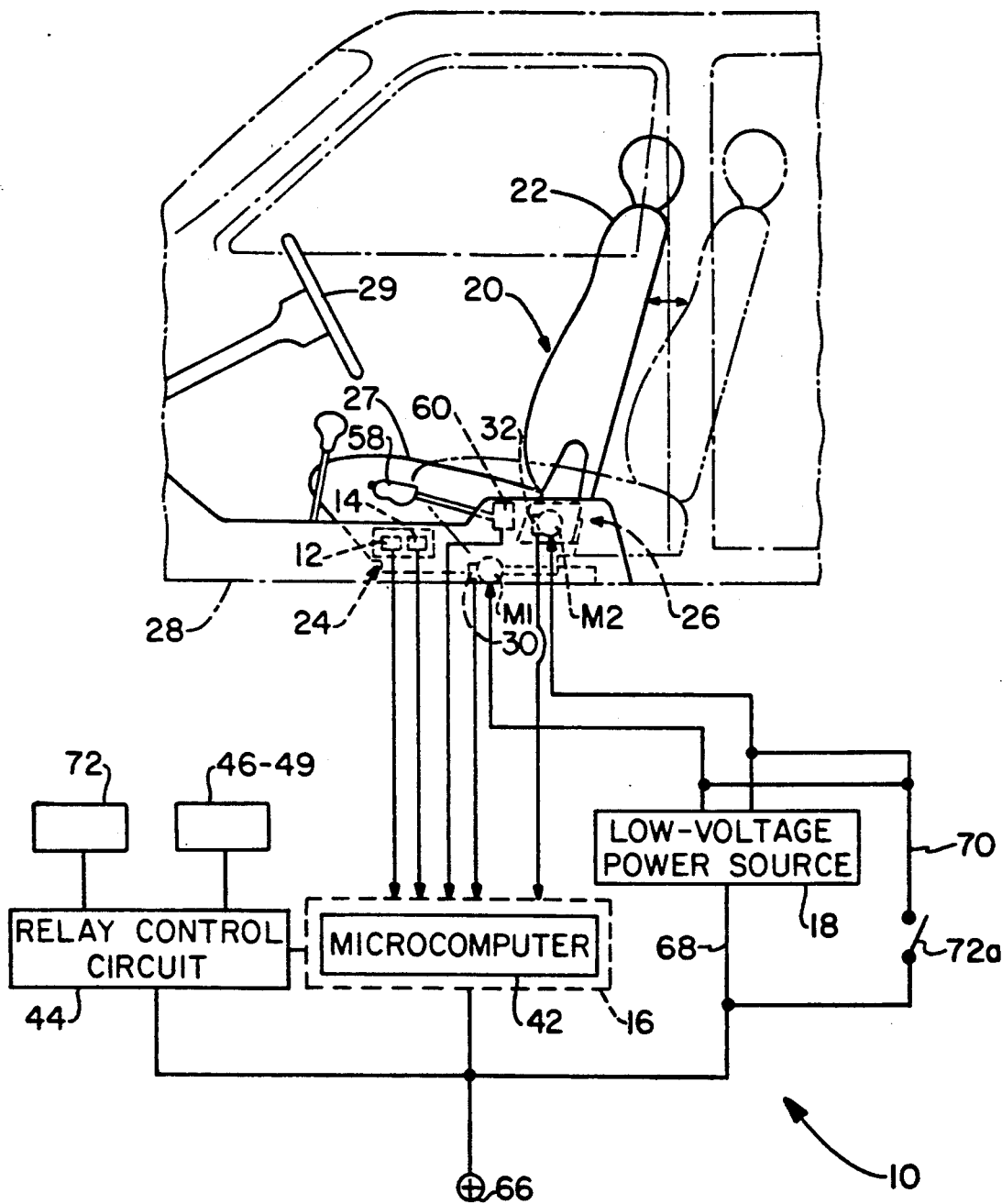
FIG. 2 is a schematic diagram showing an electrical connection among devices and movable members of the seat.
Figure 3:
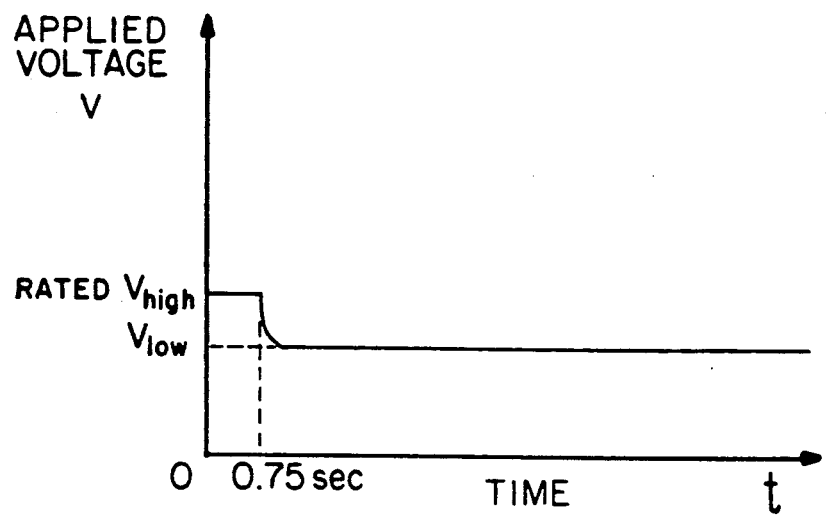
FIG. 3 is a graph showing characteristics of voltage being applied to the motor in a manual control mode according to the invention.
Figure 4:
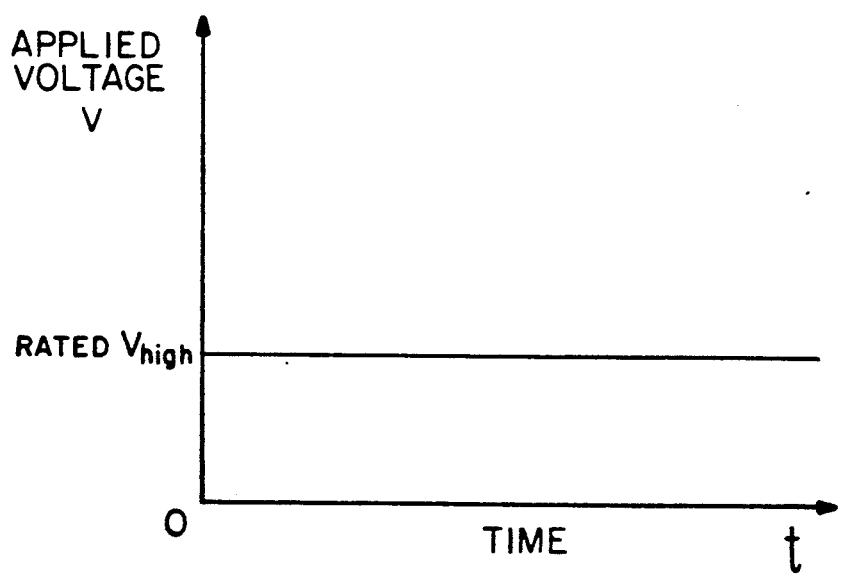
FIG. 4 is a graph showing a characteristics of voltage being applied to the motor in an automatic control mode.

Referring to FIGS. 1 through 3, is illustrated a motor control device (10) for a powered seat (20), which comprises a manual switch (12), memory switch (14), central processing unit (16) (to be referred to as "CPU"), low-voltage power source (18), motor (M1) for a seat slide device (24), and motor (M2) for a reclining device (26). Those two motors are preferably DC geared motors.

The seat slide device (24) is disposed between the seat cushion (28) and floor (29), and is actuated by the motor (M1) to move the seat (20) forwardly and backwardly in a sliding manner.

As shown in FIG. 2, the seat (20) is movable between a given driving position indicated by the solid line and a withdrawn position indicated by the phantom line, the latter position being for allowing an occupant to enter the automobile and climb onto the seat (20) easily.

The reclining device (26) is actuated by the second motor (M2) to incline the seat back (22) of the seat (20) adjustably as indicated by the arrow in FIG. 2 to attain a desired reclining angle.

These devices (24)(26) are known devices, and a specific description thereon is omitted here.

Referring to FIG. 1, the two motors (M1)(M2) are equipped with a seat position detecting means (30)(32), respectively. In the shown embodiment, those means comprise rotation sensors (30)(32), respectively, each consisting of disc-like magnet (34) and lead switch (36) adjacent thereto, the switch (36) being connected electrically with the CPU (16). The sensors (30)(32) emit pulses in response to the rotation of output shaft to each of the corresponding motors (M1)(M2). The pulses are output into the CPU (16) and stored in memory there, as counted numbers. The counted numbers thus in memory mean the driving or withdrawn position of the seat (20) and/or the reclining angle of the seat back (22). Preferably, the counting of the motor rotation is raised for normal drive of the motor and is reduced for reverse drive of the same.

The motors (M1)(M2) are connected with the manual switch (12) which includes a slide switch (38) for driving the first motor (M1) to cause fore-and-aft sliding motion of the seat (20) and a reclining switch (40) for driving the second motor (M2) to cause inclining of the seat back (22). The manual switch (12) is located at a slide of the seat cushion (27), as in FIG. 2. Preferably, both switches (38)(40) are a see-saw type, self-returnable switches having a neutral switch point and two contact points, and they are connected with the CPU (16), as shown.

The CPU (16) has a microcomputer (42) which can be programed properly for attaining various intended motions of the device (10) by outputting a proper control signal to the relevant circuits and drive portions.

As understandable from FIGS. 1 and 2, in case of the manual switch (14), if the slide switch (38) is operated, a control signal is output through the CPU (16) and a relay control circuit (44) into the first relay (RL1), thereby energizing same to drive the first motor (M1) in a desired rotational direction, while on the other hand, to operate the reclining switch (40) will output a control signal through the CPU (16 and relay control circuit (44) into the second relay (RL2), thereby energizing same to drive the second motor (M2) in a desired rotational direction. Although stated briefly, in this way, the fore-and-aft motion of the seat (20) and reclining adjustment of the seat back 22) can be effected, and specific electric flows and drives can be read from diagrams of FIGS. 1 and 2, sufficient for the expert in this field to understand.

The memory switch (14) is arranged in the present device (10) such as to permit presetting and storing the forward and backward points of the seat (20), as well as the reclining angle of the seat back (22). Thus, the memory switch (14) includes a setting switch (52) and memory call switches (54)(56), both of them being preferably a push switch of self-returnable type and connected with the CPU (16) as shown.

Operating the setting switch (52) will place in the memory of the CPU (16) the counted numbers respectively associated with the motors (M1)(M2), which has been counted through the rotation sensors (30)(32), whereupon the forward and backward points of the seat (20) and reclining angle of the seat back (22) will be stored as counted numbers in the CPU (16). After such memory operation, if the memory call switch (54) is operated, the CPU (16) will firstly make comparison between the counted value of a present position of the seat (20) and that of memory position thereof stored as above in memory. Then, if both two count values are not in registry with each other, the CPU (16) will supply a control signal into the relay control circuit (44), energizing a relevant one of the first and second relays (RL1) (RL2), thereby causing the relevant one of the motors (M1)(M2) to drive for returning the seat (20) or seat back (22) to the memory position.

Designation (56) denotes an additional memory call switch which is intended to allow another memory for setting and calling a another kind of seat motion.

Although not shown, preferably a seat withdrawal switch may be provided in the memory switch (14), so that the seat (20) can be moved to a given withdrawn position.

Similar to the manual switch 12), the memory switch (14) is located at the side of the seat cushion (27).

Designation (60) denotes a hand brake sensor for detecting a locked state of a hand brake (58) see FIG. 2), the sensor (60) being connected also with the CPU (16), as shown. If the sensor (60) detects the brake (58) to be in the locked state, a signal will be output from the CPU (16), instructing the motors (M1)(M2) to allow their drives. This means that, only during driving the car, namely, with the hand brake (58) in unlocked state, all manual and memory switches (12)(14) are prohibited against operation, thus serving to protect the occupant against undesired seating posture which might be result from the operation of those switches (12)(14).

Designations (62)(64) refer to over-current detector resistances associated with the motors (M1) (M2) respective, which, in response to any overcurrent occurring in the circuit adjacent the respective motors (M1)(M2), will send a signal to the CPU (16), giving a control signal therefrom to cease the drives of the motors, thus protecting them against over heat or damage.

Designation (66) refers to battery which is a power source for the present control device (10).

With respect, now, to the sliding motion of the seat slide device (24), an experiment shows that, as previously stated, a friction is created between upper and lower rails (not clearly shown) of the device (24), with a certain friction coefficient, and that its sliding motion produces much greater friction coefficient as it just begins (an initial friction coefficient), after which, as the sliding motion gets into a normal moving state with a less friction coefficient which is as little as about one tenth or more (contrast to such higher ten-time initial friction coefficient). In other words, during the normal moving state, the seat (20) can be moved with as small as about one tenth torque of the motor (M1), while conversely requiring about ten-times torque for moving the seat (20) at the initial moving state.

Focusing those data of the experiment, the control device 10 includes the low-voltage drive system for supplying a low voltage to the motors (M1)(M2) only during the normal moving state of the seat (20), in the case of operating the manual switch (14), whereby in the manual control mode, a rated high voltage is applied to the motors (M1)(M2) during the initial drive point and thereafter a low voltage is applied to them at the normal drive point.

Specifically, as can be seen from FIGS. 1 and 2, in the circuit shown, there are incorporated two electric lines (68)(70) which are interposed in parallel between the battery (66) and motors (M1) (M2) and connected electrically therewith. In the first line (68), a low-voltage power source (18) is disposed, which functions to lower the voltage supplied from the battery (66), so that the motors may give a low torque down to the point of as small as one tenth or so relative to a normal torque.

In the other second line (70), is disposed a relay contact point (72a) associated with a voltage control relay (72) which is connected with the relay control circuit (44). Normally, the contact point (72a) is turned "on" to render the second line (70) active to provide a closed circuit between the battery (66) and motors (M1)(M2).

A timer (T) is incorporated in the CPU (16), with the arrangement of the timer (T) being such that it is to be reset to zero second in response to the operation of the manual switch (12), and starts to count time up to approx. 0.75 seconds, after the lapse of that time limit, the timer is turned off to stop the flow of high voltage from the battery (66) to the motors (M1)(M2), switching over the current to the low-voltage power source (18), as will be stated later. It is noted here that such 0.75 sec. time is determined by adding 50% of allowance to a basic time of 0.5 sec. which is practically required in order for the seat (20) to slide from the initial moving state with a great friction coefficient to the normal moving state with a reduced friction coefficient in the slide device (24).

With the above-described system, when operating the manual switch (12), a corresponding signal is input into the CPU (16) which in turn causes the relevant one or both of motors (M1)(M2) to drive and reset the timer (T) to zero second. The timer (T) starts to count time. At this moment, the contact point (72a) of the voltage control relay (72) is in the "on" state, whereupon a rated voltage is supplied from the battery (66) to the motors (M1)(M2). Hence, as understandable from FIG. 3, the motors are driven at a high rotation rate, and then, as the foregoing time limit, 0.75 sec. has lapsed, the timer (T) is turned off to stop counting the time, and responsive thereto, the CPU (16) supplies a control signal to the relay control circuit (44), energizing the voltage control relay (72) to open the contact point (72a) into an "off" state. This places in a closed circuit between the battery (66) and motors (M1)(M2), hence allowing flow of a low voltage from the low-voltage power source (18) to the motors (M1) (M2) via the first line (68). Accordingly, the motors are driven at a low rotation rate, so that the seat (20) and/or seat back (22) may be moved at a low speed.

During such motion of the seat (20) or seat back (22), upon turning off the manual switch (12), the relevant one of the relays (RL1)(RlL2) is actuated to stop the corresponding motor (M1 or M2), so that the seat (20) or seat back (22) may be stopped at desired point in such low-speed motion.

On the other hand, when operating the memory call switches (54)(56), the relay contact (72a) is normally turned "on", which thus allows flow of a rated voltage into the motors (M1)(M2), namely, applying a high voltage thereto, from the battery (66). Accordingly, the motors are rotated at a high rotation rate, so that the seat (20) and/or the seat back (22) may be moved to the memory position at a rapid speed.

It is therefore seen that, in the manual control mode effected by the manual switch (12), firstly at the initial motion stage of the motors (M1)(M2), a normal rated (high) voltage is applied from the battery (66) to those motors, causing them to drive at a high rotation rate, and after lapse of a given time, the voltage applied is transformed into a low voltage, thereby causing the motors to drive at a low rate, whereas by contrast, in the automatic control mode effected by the memory switch (14), the normal voltage is applied from the battery (66), as it is, to the motors, so that they are driven at a high rotation rate.

Therefore, according to the present invention, the manual control mode serves to permit stopping the seat (20) and/or seat back (22) at a low speed of the associated slide device (24) and reclining device (26), whereby an inertia force in the respective devices is small enough to attain accuracy in having the seat (20) and/or seat back (22) stopped at a desired point.

Further, in this system, no complicated means are required to supply the high and low voltages selectively, since the circuit arrangement shown suffices for that purpose.

The present invention may be applied to other kinds of vehicle seats, and it should be understood that the invention is not limited to the illustrated embodiment, but any other modifications, replacements and additions may structurally be possible without departing from the spirit and scope of the appended claims. For example, the control device (10) may be applied to other seat adjustment devices or mechanisms, such as a seat lifter, a movable headrest, and a side support device, in this sort of powered seat.

What is claimed is:

1. A method for controlling a motor in a powered seat, in which a seating posture adjustment means is actuated by controlling a drive of motor, so as to move a movable member associated with said seating posture adjustment means at a desired point, said method comprising the steps of:

permitting selective choice between a manual control mode to be effected by a manual switch and an automatic control mode to be effected by a memory switch capable of storing data for position of said movable member and calling said data;

applying a high voltage, in said manual control mode, to said motor, so that, at an initial motion of said movable member, said motor is driven at a high rotation rate sufficient to overcome a frictional or an inertia force inherent in said movable member, and then after lapse of a predetermined time, changing said high voltage over to a low voltage, whereby said motor is caused to firstly be moved quickly, and secondly, after said time, said motor is caused to be moved slowly for manual control thereof; and applying a high voltage in said automatic control mode, to said motor, whereby said motor is driven constantly at a high rotation rate.

2. The method according to claim 1, wherein said movable member comprises a seat slide device for causing fore-and-aft motion of said seat and a reclining device for inclining a seat back of said seat at a desired angle.

3. The method according to claim 1, wherein said motor is applied a rated voltage from a power source.

4. A device for controlling a motor in a powered seat, comprising:

at least one motor for causing a given motion of a movable member of a seating posture adjustment means provided in said seat;

a manual switch capable of causing said motor to drive so as to effect adjustment of position for said movable member of said seating posture adjustment means;

a memory switch for storing in memory data for positions of said movable member which has been adjusted, as a memory position, and calling said data;

a central processing unit which processes data being input thereinto according to a predetermined program, to thereby control a drive of said motor and voltage being applied to said motor;

a power source connected electrically with said motor, manual switch, memory switch and central processing unit;

a low-voltage power source for lowering a voltage supplied from said power source at a given low level; and a means associated electrically with said manual switch, said means being so arranged as to firstly allow said voltage from said power source to be flowed to said motor, and to secondly, after lapse of a given time, change said voltage into a low voltage through said low-voltage power source, wherein operation of said memory switch effects an automatic control mode for applying said voltage from said power source to said motor, thereby causing said motor to be driven at a constant rotation rate, and operation of said manual switch effects a manual control mode for activating said means and said low-voltage power source to thereby automatically change said voltage into said low voltage through said means and said low-voltage power source; and wherein said means includes a pair of first and second electric lines arranged in parallel with each other, which are electrically connected with said power source, one of said two electric lines having said low-voltage power source disposed midway therein, and the other of them having, disposed midway therein, a relay contact means of a voltage control relay connected with said central processing unit, whereby, when said relay contact means is turned on, said voltage from said power source is applied to said motor, thus causing said motor to be driven at a high rotation rate, whereas, when turning off said relay contact means, said low voltage is applied from said low-voltage power source to said motor, thus causing said motor to be driven at a low rotation rate.

5. The device according to claim 4, wherein two motors are connected with a manual switch which includes a slide switch for driving said first motor to cause fore-and-aft sliding motion of said seat and a reclining switch for driving said second motor to cause inclining of said seat back of said seat, wherein a relay means is arranged for permitting said CPU to cause respective drives of said two motors through said relay means.

* * * * *